United States Patent
Casamenti et al.

(10) Patent No.: US 9,394,970 B2
(45) Date of Patent: Jul. 19, 2016

(54) GEAR REDUCER COMPRISING A WORM AND A WORM GEAR ASSEMBLY PROVIDED WITH A TORQUE LIMITER

(71) Applicant: BONFIGLIOLI RIDUTTORI S.p.A., Calderara di Reno (IT)

(72) Inventors: Gustavo Casamenti, Forli (IT); Andrea Legnaro, Calderara di Reno (IT); Matteo Zucchini, Calderara di Reno (IT)

(73) Assignee: BONFIGLIOLI RIDUTTORI S.p.A. (IT)

( * ) Notice: Subject to any disclaimer, the term of this patent is extended or adjusted under 35 U.S.C. 154(b) by 0 days.

(21) Appl. No.: 14/381,120

(22) PCT Filed: Feb. 27, 2013

(86) PCT No.: PCT/IB2013/051570
§ 371 (c)(1),
(2) Date: Aug. 26, 2014

(87) PCT Pub. No.: WO2013/128386
PCT Pub. Date: Sep. 6, 2013

(65) Prior Publication Data
US 2015/0033892 A1 Feb. 5, 2015

(30) Foreign Application Priority Data
Feb. 27, 2012 (IT) .............................. BO2012A0090

(51) Int. Cl.
*F16H 1/16* (2006.01)
*F16D 7/02* (2006.01)
(Continued)

(52) U.S. Cl.
CPC *F16H 1/16* (2013.01); *F16D 7/027* (2013.01); *F16H 35/10* (2013.01); *F16H 2057/0213* (2013.01); *Y10T 74/19828* (2015.01)

(58) Field of Classification Search
CPC ............ F16H 1/16; F16H 35/10; F16D 7/027
USPC ....... 74/412 TA, 412, 475, 7 D, 10.85, 89.14, 74/724, 425, 458, 500; 477/176, 37, 16, 477/39, 57, 62, 70, 74, 77, 79, 83, 86, 87, 477/171, 179, 180; 192/53.362, 85.19, 192/54.1, 70.16, 70.17, 84.94; 242/390.6, 242/90.9, 394.1, 545.1; 475/7, 228, 226, 475/229, 304, 333
See application file for complete search history.

(56) References Cited

U.S. PATENT DOCUMENTS 1,473,570 A * 11/1923 Leyner .................... B62D 5/02
180/9.46
4,683,766 A 8/1987 Hatakeyama et al.
(Continued)

FOREIGN PATENT DOCUMENTS

| EP | 1591745 | 11/2005 |
|---|---|---|
| EP | 1793143 | 6/2007 |

(Continued)

OTHER PUBLICATIONS

International Search Report and Written Opinion of PCT/IB2013/051570 dated Jun. 19, 2013.

*Primary Examiner* — William Kelleher
*Assistant Examiner* — Leonard J Archuleta
(74) *Attorney, Agent, or Firm* — The Belles Group, P.C.

(57) ABSTRACT

A gear reducer comprising a worm and a worm gear assembly, in turn comprising a worm gear, which is connected/disconnected to/from a drive shaft by means of a torque limiter mounted on this latter. The gear reducer is characterized in that the drive shaft and the torque limiter are comprised in a cartridge which can be extracted/inserted from/in a cavity obtained in the worm gear assembly according to an axial direction and in accordance with two opposite senses, without the need to disassemble the worm.

8 Claims, 2 Drawing Sheets

(51) Int. Cl.
*F16H 35/10* (2006.01)
*F16H 57/021* (2012.01)

(56) References Cited

U.S. PATENT DOCUMENTS

| | | | | |
|---|---|---|---|---|
| 4,813,303 | A * | 3/1989 | Beezer | F16H 1/16 464/46 |
| 6,335,580 | B1 * | 1/2002 | Cognigni | F16H 57/027 310/89 |
| 7,007,780 | B2 * | 3/2006 | Arnold | F16D 13/08 192/21 |
| 7,331,252 | B2 * | 2/2008 | Pachov | B66D 1/14 74/425 |
| 7,766,750 | B2 * | 8/2010 | Campbell | B66D 1/14 192/150 |
| 2001/0009078 | A1 * | 7/2001 | Ohta | E01H 5/04 37/242 |
| 2006/0042900 | A1 * | 3/2006 | Araki | B30B 15/10 192/18 R |
| 2008/0278404 | A1 * | 11/2008 | Blalock | H01Q 1/125 343/882 |
| 2010/0213310 | A1 * | 8/2010 | Flatt | B64C 13/50 244/99.2 |
| 2015/0225997 | A1 * | 8/2015 | Soper | E06B 9/42 160/309 |

FOREIGN PATENT DOCUMENTS

FR 2597558 10/1987
IT 1204113 3/1989

* cited by examiner

GEAR REDUCER COMPRISING A WORM AND A WORM GEAR ASSEMBLY PROVIDED WITH A TORQUE LIMITER

CROSS-REFERENCE TO RELATED PATENT APPLICATIONS

The present application is a U.S. national stage application under 35 U.S.C. §371 of PCT Application No. PCT/IB2013/051570, filed Feb. 27, 2013, which claims priority to Italian Application No. BO2012A000090, filed Feb. 27, 2012, the entireties of which are incorporated herein by reference.

TECHNICAL FIELD

The present invention relates to a gear reducer comprising a worm and a worm gear assembly provided with a torque limiter.

BACKGROUND ART

A gear reducer of this type is known from the European patent application EP-A1-1 793 143 filed by the present applicant.

One of the main defects of the gear reducer described in this document is constituted by the fact that it is difficult to disassemble. In fact, for example, in the case in which it is necessary to change a worn disc of the torque limiter, the worm gear assembly must first be disassembled from the worm to allow extraction of the whole worm gear assembly.

DISCLOSURE OF INVENTION

The aim of the present invention is to provide a simple and reliable solution to the problem of disassembly of the torque limiter without requiring to disassemble the whole gear reducer.

Therefore, the present invention relates to a gear reducer comprising a worm and a worm gear assembly, in turn comprising a worm gear, which is connected/disconnected to/from a drive shaft by means of a torque limiter mounted on this latter; the gear reducer is characterised in that the drive shaft and the torque limiter are comprised in a cartridge which can be extracted/inserted from/in a cavity obtained in the worm gear assembly according to an axial direction and in accordance with two opposite senses, without the need to disassemble the worm.

BRIEF DESCRIPTION OF THE DRAWINGS

The example below is provided purely for non-limiting illustrative purposes, to allow better understanding of the invention with the aid of the accompanying figures, wherein.

BEST MODE FOR CARRYING OUT THE INVENTION

Figure 1:
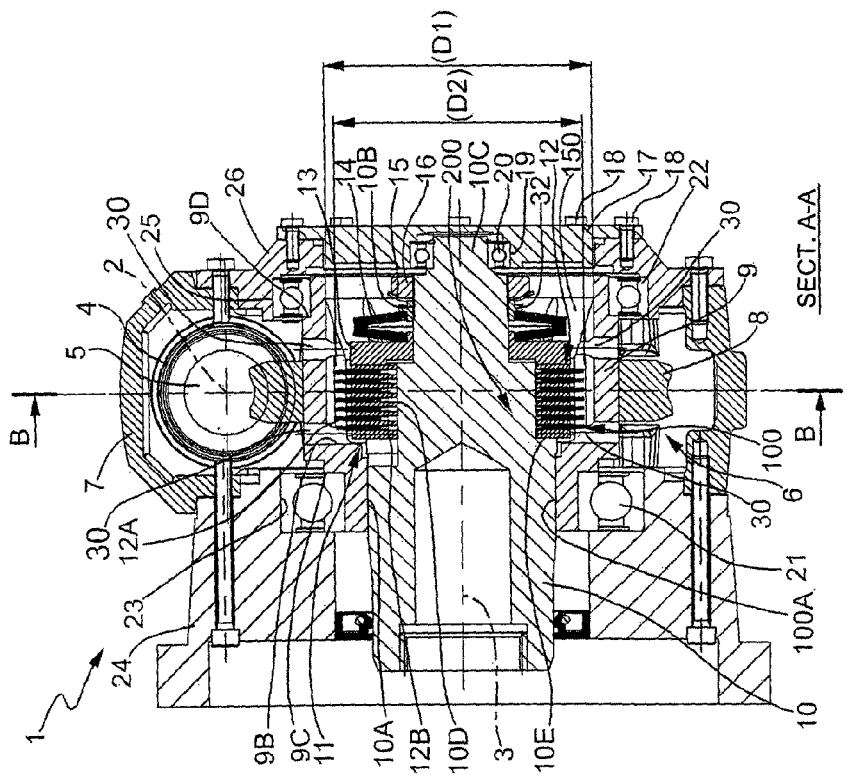
FIG. 1 shows a longitudinal section A-A of a preferred embodiment of a worm/worm gear-assembly gear reducer forming the main object of the present invention.

In FIG. 1 the worm/worm gear-assembly gear reducer forming the main object of the present invention has been indicated as a whole with the reference number 1.

The gear reducer 1 is suited to transmit a rotary motion between two mutually orthogonal axes 2 and 3 (each of which identifies a respective axial direction) and comprises a worm fitted on a shaft 5 coaxial with the axis 2, and a worm gear assembly 6 suited to rotate about the axis 3. The worm 4 and the worm gear assembly 6 are contained within a casing 7.

In turn, the worm gear assembly 6 comprises a worm gear 8, a worm gear-carrier hub 9 and a drive shaft 10 supported by the same worm gear-carrier hub 9.

It must be noted that the worm gear 8, the worm gear-carrier hub 9 and the drive shaft 10 have the same axis 3 as longitudinal axis of symmetry. Moreover, the drive shaft 10 is inserted inside a cavity 100 obtained in the worm gear-carrier hub 9. It must also be noted that a portion 10A of the surface of the drive shaft 10 is coupled without interference with the portion 100A of the worm gear-carrier hub 9.

As well known in the art, the worm gear 8, normally made of bronze, is cast directly onto the worm gear-carrier hub 9, normally made of cast iron, so that the two elements are integral with each other.

The worm gear assembly 6 also comprises a torque limiter 11, which, as will be better explained below, is suited to make the worm gear-carrier hub 9 (and, therefore, also the worm gear 8 which, as already stated, is integral with this worm gear-carrier hub 9), and the drive shaft 10 integral with each other.

More in detail, the torque limiter 11 comprises an assembly of discs 12 composed of a first group of discs 12A made of a material with high friction coefficient, in use, mechanically coupled to the worm gear-carrier hub 9, alternated with a second group of discs 12B made of steel, in use mechanically coupled to the drive shaft 10. When the assembly of discs is in its packed configuration, the rotary motion about the axis 3 of the worm gear 8 is transmitted first to the worm gear-carrier hub 9 (integral with the worm gear 8) and then to the drive shaft, due to the two groups of discs 12A, 12B packed against each other (see below).

Figure 2:
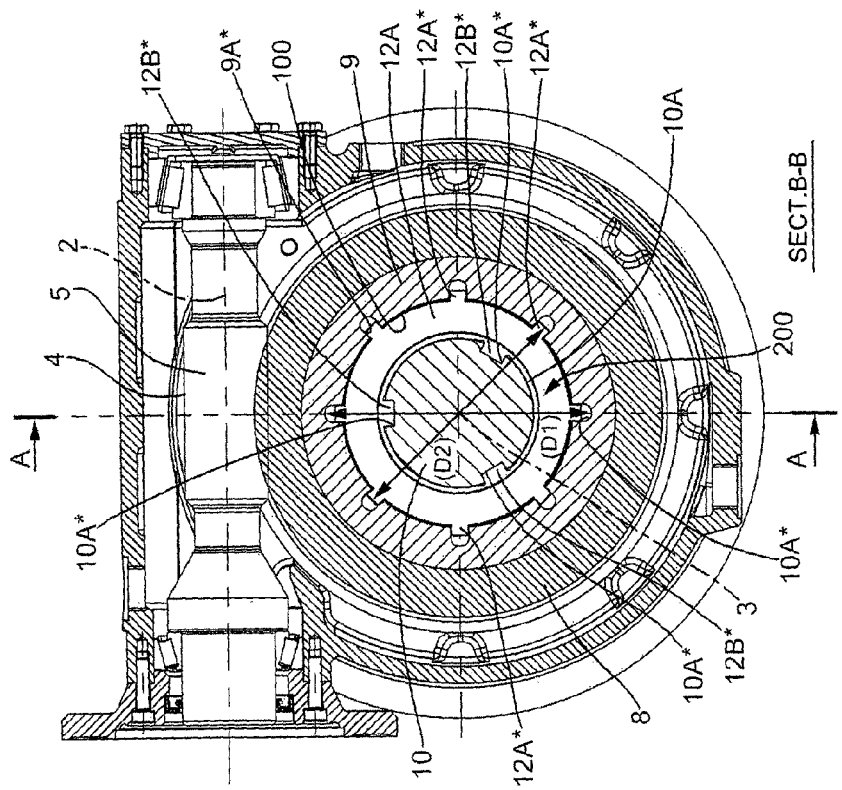
FIG. 2 shows a cross section B-B of the gear reducer of FIG. 1.

By observing FIG. 2 it can be noted that each disk 12A is provided with a series of outer projections 12A* equidistant from one another. Each outer projection 12A* is inserted in a respective longitudinal seat 9A* obtained on the surface of the cavity 100, which, as stated, is obtained in the worm gear-carrier hub 9.

Analogously, each disc 12B is provided with a plurality of inner projections 12B*, which are coupled with longitudinal seats 10A* obtained on the outer surface 10D of the drive shaft 10.

In actual fact, in FIG. 2 any disc 12B, coupled with the drive shaft 10, is covered, almost totally, by a respective disc 12A, placed in front of the disc 12B, coupled with the worm gear-carrier hub 9.

Therefore, in FIG. 2 only the inner projections 12B* of the disc 12B are visible, each of which, as stated previously, is inserted in a respective seat 10A* obtained on the outer surface 10D of the drive shaft 10.

As is well known in the art, if the torque transmitted between the worm 4 and the worm gear 8 by means of the gear reducer 1 exceeds a certain predetermined value, the first group of discs 12A of the torque limiter 11 slips with respect to the second group of discs 12B according to the description provided, for example, in the aforesaid European patent application EP-A1-1 793 143.

As shown in FIG. 1, the shaft 10 contains a stop 10E extending radially with respect to the axis 3, and against which the assembly of discs 12 is thrust under the action of a spacer 13 compressed by a pair of Belleville washers 14 (with axis 3) arranged around the drive shaft 10.

Moreover, the torque limiter 11 comprises a safety and adjusting washer 15, also arranged around the drive shaft 10; this safety washer 15 is also subjected to the action of the Belleville washers 14 and held in position by a locking ring nut 16 screwed onto the drive shaft 10 provided on its surface with a thread 10B.

In other words, the axial position of the adjusting and locking ring nut 16, and therefore also of the safety washer 15, through the spacer 32, determines the extent of compression of the Belleville washers 14, which exert a thrust on the spacer 13 which, in turn compacts the assembly of discs 12 against the aforesaid opposing stop 10E.

The torque limiter 11 is closed inside the casing 7 by a lid 17 screwed onto the same casing 7 by means of a plurality of screws 18 (FIG. 1). On this lid 17A a longitudinal seat 19 is obtained (centred on the axis 3), which houses a rolling bearing 20 with axis 3 into which, in use, an end 10C of the drive shaft 10 is inserted. This centering bearing 20 enables perfect centering of the drive shaft 10 with respect to the axis 3.

By going back to the worm gear-carrier hub 9, it can be noted that it has a substantially cylindrical shape and that it is provided with two lateral shoulders 9C and 9D, each of which is suited to house a respective rolling bearing 21, 22 onto which the stresses on the worm gear assembly 6 are discharged.

The rolling bearing 21, on one side, is housed in the shoulder 9C obtained on the outer surface of the worm gear-carrier hub 9, whereas, on the other side, it is housed in a breaking 23 obtained in a body 24.

Analogously, the rolling bearing 22, on one side, is housed in the shoulder 9D obtained on the outer surface of the worm gear-carrier hub 9, whereas, on the other side, it is housed in a breaking 25 obtained in a closing element 26 (FIG. 1), which is screwed to the casing 7, to which the lid 17 is effectively screwed.

Figure 3:
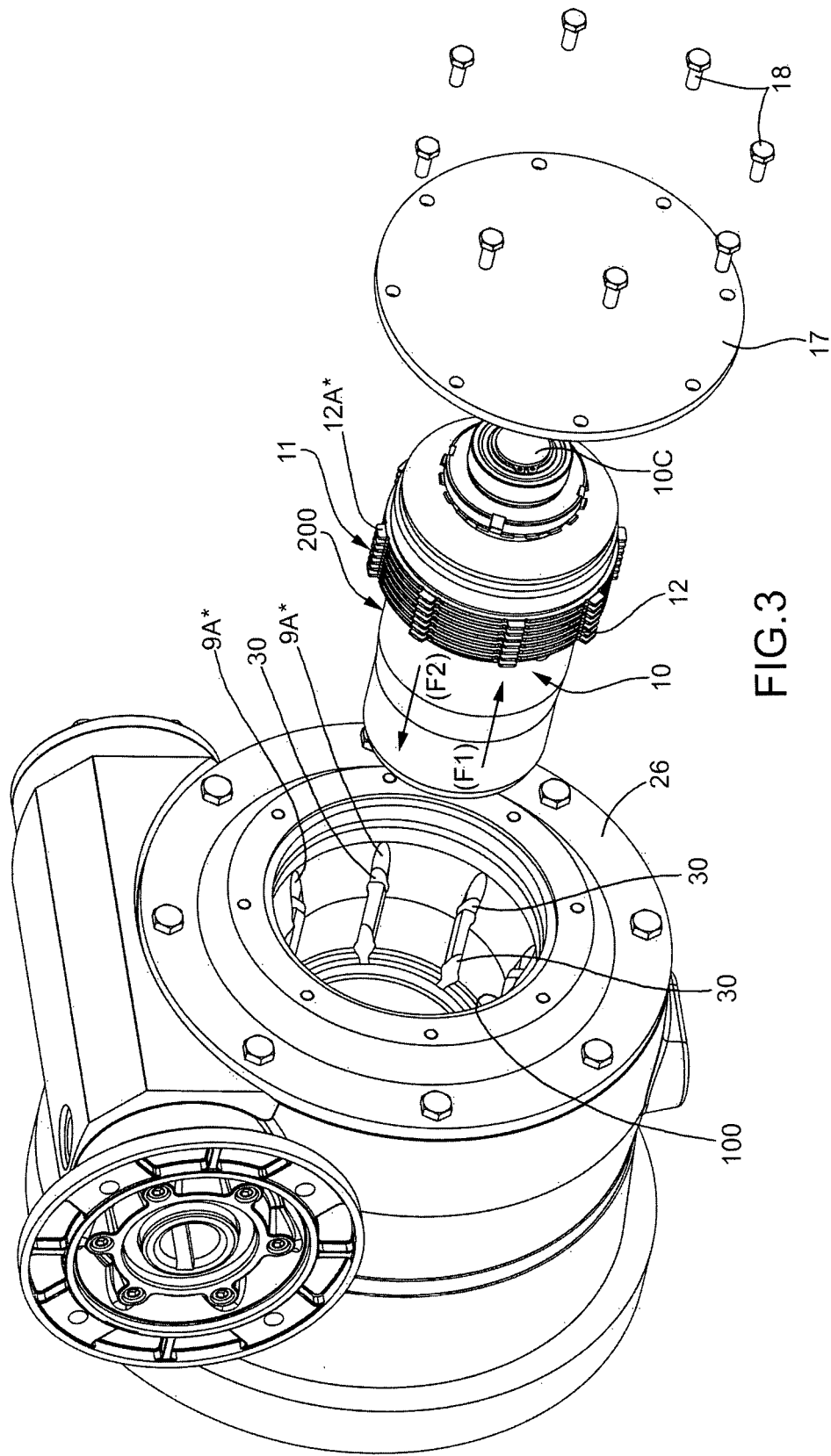
FIG. 3 shows a partially exploded view of the gear reducer of FIGS. 1 and 2.

As shown in FIGS. 1, 3, the worm gear-carrier hub 9 has a number of radial holes 30 to allow the passage of lubricating oil from an area occupied by the worm 4 and by the worm gear 8 to an area in which the torque limiter 11 is housed.

Moreover, it can be noted that, as shown in FIG. 2, the distance (D1) between the bottoms of two diametrically opposite longitudinal seats 9A* is greater than the distance (D2) between the crests of two diametrically opposite outer projections 12A*.

In fact, if we name the assembly given by the drive shaft 10 and by the assembly of discs 12 of the torque limiter 11 "cartridge 200", it can be noted that, due to the fact that the distance (D1) is greater than the distance (D2), this cartridge 200 can be easily extracted from the gear reducer 1 simply by unscrewing the lid 17 (FIG. 3) and removing this cartridge 200 axially from the cavity according to a sense given by an arrow (F1).

In other words, the fact that the distance (D1) is greater than the distance (D2) ensures that the cartridge 200 can be extracted from the cavity 100 (according to the arrow (F1); FIG. 3) simply by sliding it out, without any interference whatsoever between any portion of the cartridge 200 and the remaining elements of the gear reducer 1.

During the operation to remove the cartridge 200 (according to the arrow (F1)), each outer projection 12A* slides axially in the respective longitudinal seat 9A* (FIG. 3).

Incidentally, it must be noted that the following elements can also be mounted on the shaft 10:
the spacer 13;
the pair of Belleville washers 14;
the safety washer 15;
the spacer 32; and
the adjusting and locking ring nut 16.

Therefore, by extracting the cartridge 200 from the cavity 100 the aforesaid elements 13, 14, 15, 32, 16 can also be removed simultaneously.

During maintenance of the gear reducer 1, after having changed any damaged elements of the cartridge, the operator inserts the overhauled cartridge 200 into the cavity 100 according to a sense given by the arrow (F2) opposite that of the aforesaid arrow (F1).

Naturally, in this reverse operation each outer projection 12A* slides axially in the respective longitudinal seat 9A* according to the arrow (F2) (FIG. 3).

Given that the aforesaid elements 13, 14, 15, 32, 16 have already been mounted on the shaft 10, after having adjusted the thrust force, by means of the adjusting and locking ring nut 16, exerted on the discs 12 by the pair of Belleville washers 14, the operator closes the lid 17, screwing down the screws 18 on the closing element 26.

The main advantage of the gear reducer forming the subject of the present invention consists in the fact that it facilitates disassembly of the torque limiter and of the shaft that supports it without requiring to disassemble the rest of the gear reducer.

A further advantage is given by the fact that, due to the centering bearing on the lid, centering of the shaft with the longitudinal axis of symmetry of the gear reducer is obtained.

The invention claimed is:
1. A gear reducer comprising:
a worm; and
a worm gear assembly, the worm gear assembly comprising a worm gear, which is connected/disconnected to/from a drive shaft by means of a torque limiter mounted on this latter;
wherein said drive shaft and said torque limiter are comprised in a cartridge which can be extracted/inserted from/in a cavity obtained in said worm gear assembly according to an axial direction and in accordance with two opposite senses, without the need to disassemble said worm;
wherein between said worm gear and said drive shaft there is interposed a worm gear-carrier hub, on which said worm gear is fitted, said worm gear-carrier hub being separate from said drive shaft and being supported by respective support means, which are independent of said drive shaft; and
wherein the worm gear-carrier hub is provided with a plurality of radial holes, suited to allow the passage of a lubricating oil from an area occupied by the worm to an area in which the torque limiter is housed.

2. The gear reducer as claimed in claim 1, wherein said cavity is provided with a plurality of longitudinal seats, each of which is suited to house a respective outer projection of a related disc belonging to said torque limiter.

3. The gear reducer as claimed in claim 1, wherein the outer surface of said drive shaft is provided with a plurality of longitudinal seats each of which is suited to house a respective inner projection of a related disc belonging to said torque limiter.

4. The gear reducer as claimed in claim 1, wherein the following elements are mounted on said drive shaft:
a first spacer;
a pair of Belleville washers;
a safety washer;
a second spacer; and
an adjusting and locking ring nut.

5. The gear reducer as claimed in claim 1, wherein said cavity is closed by a lid having a longitudinal seat suited to house in its inside centering means, into which an end of said drive shaft is inserted.

6. The gear reducer as claimed in claim 2, wherein the distance between the bottoms of two diametrically opposite longitudinal seats is greater than the distance between the crests of two diametrically opposite outer projections.

7. The gear reducer as claimed in claim 1, wherein the gear reducer is provided with a first rolling bearing, which, on one side, is housed in a shoulder obtained on the outer surface of said worm gear-carrier hub, whereas, on the other side, it is housed in a breaking obtained in a body.

8. The gear reducer as claimed in claim 1, wherein the gear reducer is provided with a second rolling bearing, which, on one side, is housed in a shoulder obtained on the outer surface of said worm gear-carrier hub, whereas, on the other side, it is housed in a breaking obtained in a closing element.

\* \* \* \* \*